United States Patent [19]

Henk

[11] Patent Number: 5,088,877
[45] Date of Patent: Feb. 18, 1992

[54] BOTTOM SUPPORT GRASPING DEVICE

[75] Inventor: Bill H. Henk, Hoopeston, Ill.

[73] Assignee: FMC Corporation, Chicago, Ill.

[21] Appl. No.: 575,728

[22] Filed: Aug. 31, 1990

[51] Int. Cl.5 .............................................. B65G 57/03
[52] U.S. Cl. .................... 414/626; 414/799; 414/790
[58] Field of Search ............... 414/618, 619, 621, 622, 414/623, 626, 799, 789.9, 790; 294/119.1

[56] References Cited

U.S. PATENT DOCUMENTS

| 2,980,265 | 4/1961 | Johnson et al. | 414/621 X |
| 4,242,024 | 12/1980 | Buta et al. | 414/799 X |
| 4,256,429 | 3/1981 | Dwyer | 414/626 |
| 4,592,692 | 6/1986 | Suizu et al. | 414/626 X |
| 4,902,195 | 2/1990 | Lucas | 414/799 |
| 4,927,318 | 5/1990 | Hayden et al. | 414/626 X |

FOREIGN PATENT DOCUMENTS

| 3907332 | 7/1990 | Fed. Rep. of Germany | 414/799 |
| 0187123 | 7/1989 | Japan | 414/799 |
| 0299124 | 11/1989 | Japan | 414/799 |

Primary Examiner—Frank E. Werner
Assistant Examiner—James Eller
Attorney, Agent, or Firm—Douglas W. Rudy; Richard B. Megley

[57] ABSTRACT

A robotic pelletizer includes a roller carriage having an improved grasping device which has first and second plates contacting opposed sides of an item to be lifted, a bottom support having a plurality of fingers moveable underneath the item, and a clamping plate to contact a top of the item. An elevating device lifts the item from a support surface so that the fingers may move under the item, and thereby support the item when the elevating device is lowered.

9 Claims, 4 Drawing Sheets

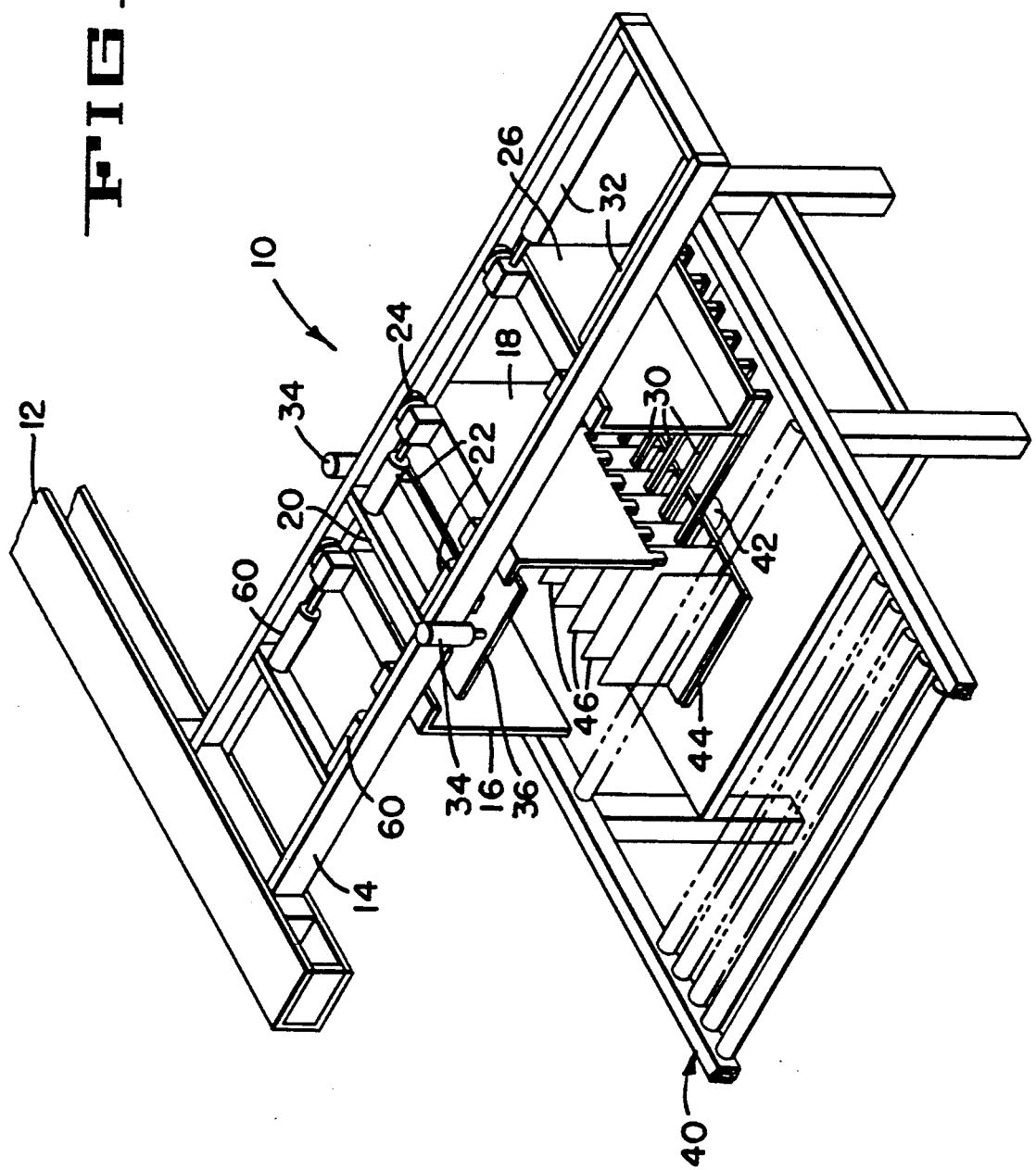

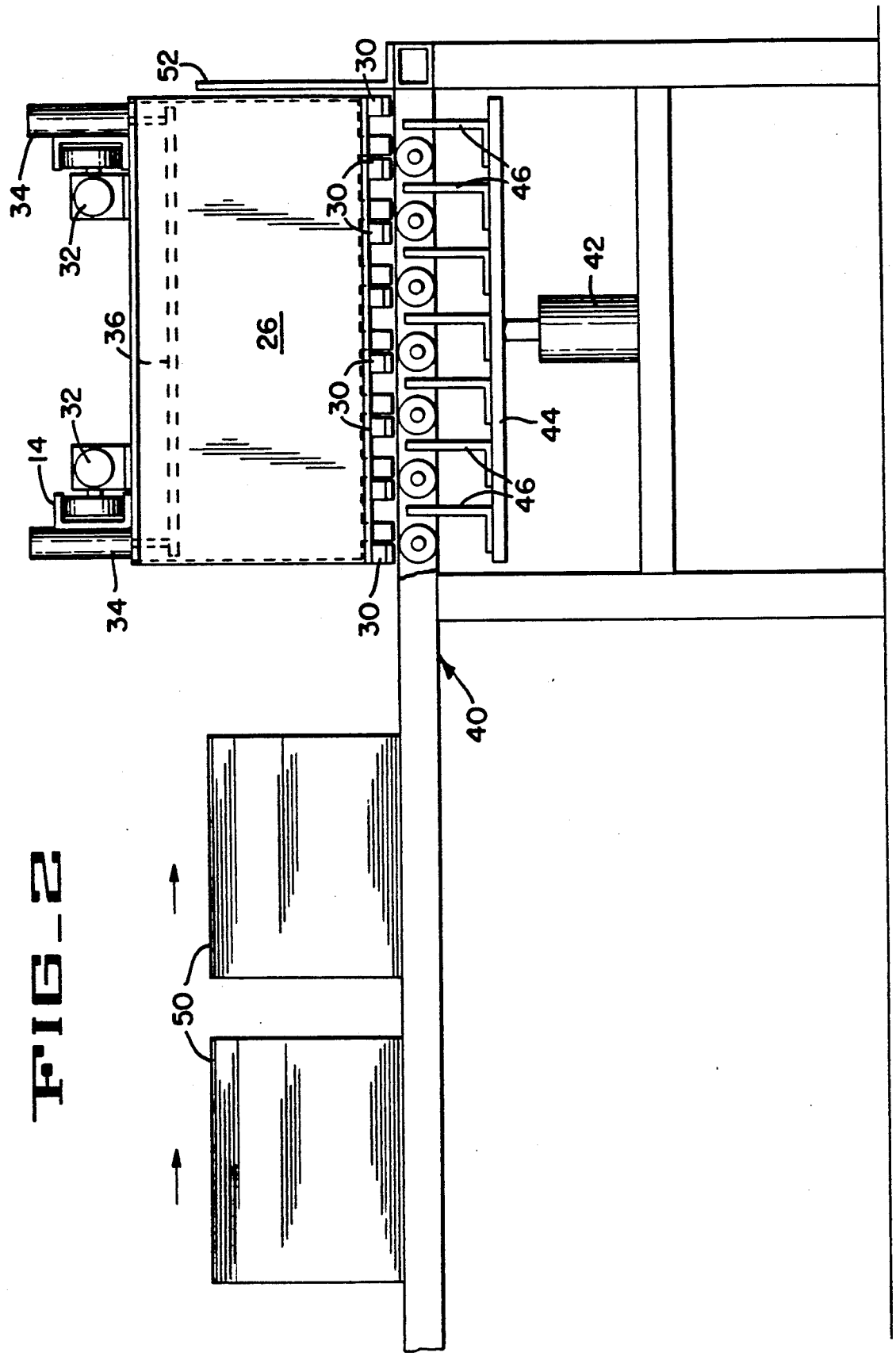

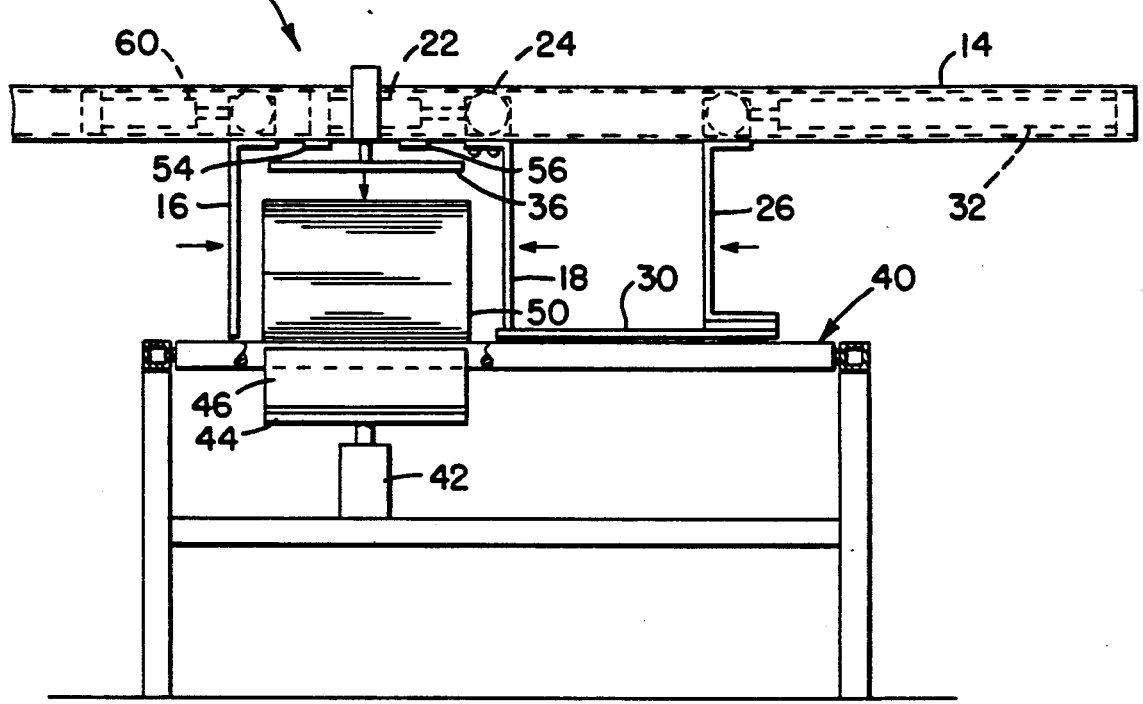
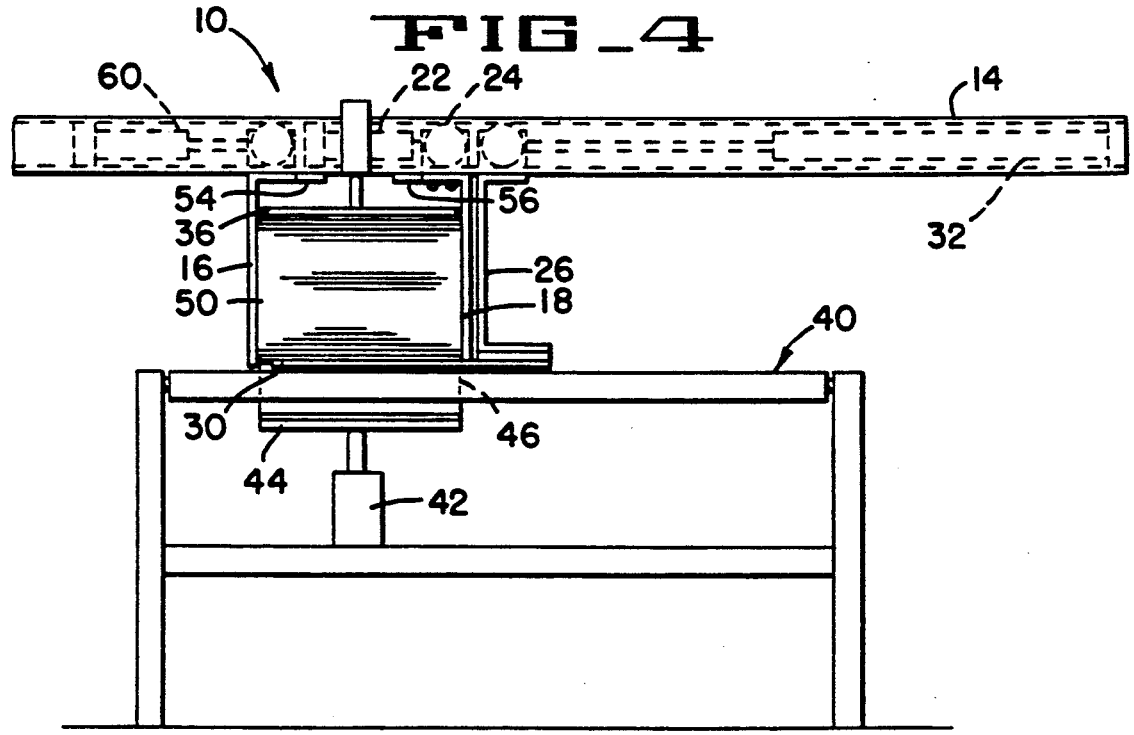

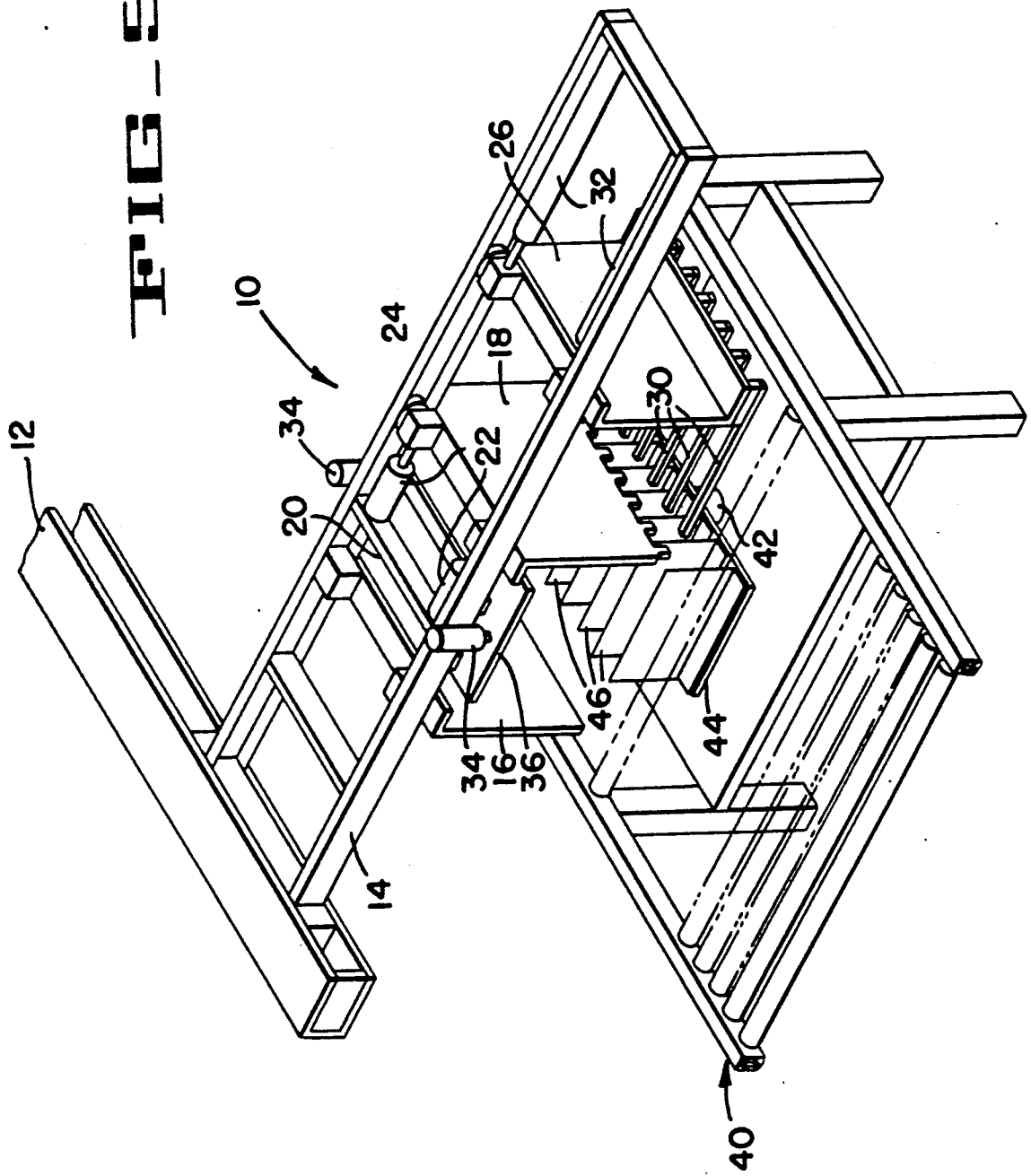

BOTTOM SUPPORT GRASPING DEVICE

BACKGROUND OF THE INVENTION

This invention relates generally to robotic palletizing equipment of the type sometimes known as cartesian-style palletizers used to transfer and stack articles from an infeed or accumulator conveyor to a pallet. More specifically, this invention has to do with the "hand" or grasping device on such a palletizer and the structure of the hand which has been designed for handling bundles of unboxed articles such as stacks of sheets of paper.

Many types of hands are well known in the industry including hands comprised of opposed palms, fork-type bottom supporting devices that are associated with a single palm, bottom supporting devices having one palm acting as a stripper palm and having a clamp for holding the supported article under pressure against the bottom supporting devices. Numerous other configurations of hands are possible as it is common to develop a hand and/or palm for specific item handling. For instance, it would be usual to have a specially shaped palm, one with semicircular indentations for instance, for lifting and palletizing buckets of paint.

The hand assembly presented herein is a specially configured hand having relatively well known components combined to provide a mechanism for handling heretofore difficult to handle product or items.

SUMMARY OF THE INVENTION

The specially designed hand presented in this disclosure is one used for the handling of stacks of sheets of paper that are not held together as a bundle through the use of straps, string, shrink wrap plastic or other containment equipment. The hand is comprised of three primary elements including a pair of palms, a bottom support palm having fingers for supporting a bundle from the bottom, and a clamping plate that can be urged into position on top of the bundle supported on the fingers of the bottom support palm to further assist in holding the bundle in place. Given this hand assembly it can be seen that a relatively loose bundle of sheets of paper is supported from the bottom, from both sides, and from the top by the hand. In order to allow the fingers of the bottom support plate to get under the bottom side of the bundle an elevating means, herein a lifter bar plate, comprised of a set of vertically disposed plates is mounted to the bundle receiving station or roller conveyor station such that the elevating means can be cycled between a position below a bed of rollers and to a position above a bed of rollers while supporting the bundle such that the fingers of the bottom support palm can be actuated into a position under the bundle.

The invention set forth herein is a modification to a robotic palletizer of the type used to transport an item from a first location to a second location, typically a palletizing station. The robotic palletizer, which is normally equipped with a grasping device, is provided herein with an improved grasping device as well as elevating means to allow the grasping device to securely pick up and transport an item served to the robotic palletizer. The grasping device includes a movable roller carriage attached to and a part of the robotic palletizer. The movable roller carriage is movable to a position above the first location, which would be the normal accumulation area for an item to be picked up, and to a second position above a pallet being loaded. The pallet in the second position could also be a holding conveyor, holding zone or another work zone. The grasping device comprises a pair of palms including a first palm and a second palm each carried on the movable roller carriage in a relatively conventional way. Both palms include a substantial flat vertical plate extending downwardly from the movable roller carriage and the second palm further may include projecting fingers extending downwardly from the lower most edge on the second palm. A third palm called a bottom support palm is also carried by said movable roller carriage and in addition to a substantial vertical member, in a preferred embodiment another plate, the bottom support palm has a plurality of fingers projecting or eminating from a lower edge of the bottom support palm generally at right angles thereto which extend inboard toward the first and second palm set. This palm is mounted for horizontal movement along the movable roller carriage such that the fingers can be inserted underneath the item to be picked up from the first location.

In order to provide the fingers clearance underneath the item to be picked up, an elevating means is provided in the first location to elevate the item to be picked up above the conveyor bed surface. The elevating means includes a cylinder supporting a lifter bar plate to which a plurality lifter bars are attached. The lifter bars are arranged parallel to a set of rollers at the first station such that the lifter bars, when the cylinder is extended, project through and above the conveyor rollers in a relatively conventional way. By elevating the item to be picked up in such a manner the fingers of the bottom support palm can be moved inboard underneath the item to be picked up.

It would be usual to then have the first and second palms moved inboard to grasp the item from the sides and also to lower a clamping plate downwardly from the movable roller carriage to hold the item from the top. In this configuration the item will be held by a pair of palms at the sides of the item, the item will be supported from below by the fingers of the bottom support palm and the item will be constrained from above by means of the clamping plate.

One object of this invention is to provide the ability to transport bundles of unrestrained sheets of paper from a first position on a roller conveyor stationed to a second position on a pallet without the integrity of the bundle being destroyed as the bundle is moved from one place to another. A further object of this invention is to gently support and contain a bundle of loose sheets of paper while at the same time assisting in aligning the sheets of paper in the bundle relative to each other.

Another advantage of this invention is that the device grasps a product, such as a bundle of loose paper, very gently. The device can be regulated to hold the product as tightly or as loosely as needed due to the fact that the bottom support fingers will be the primary support of the product. One other object of the invention is that it eliminates the need to band or otherwise unitize stacks of products, such as sheets of paper together, therefore saving the expense of such banding and eliminating waste or scrap due to the band contact with the stack of products.

Although the grasping device presented herein is primarily for use handling stacks of sheets of paper as a bundle it can also be used for handling heavy fragile cartons where a minimal amount of clamping pressure can only be used to prevent the crushing of the fragile cartons.

DESCRIPTION OF THE DRAWING FIGURES

FIG. 1 is a perspective view of a simplified palletizer showing the instant invention.

FIG. 2 is an elevation view of a portion of the palletizer shown in FIG. 1 with some parts broken away to expose other parts of the apparatus.

FIG. 3 is another elevation view of a simplified palletizer showing the operation of the invention just prior to a bundle of product being picked up by the hand assembly.

FIG. 4 is the same elevation view shown in FIG. 3 with the hand assembly grasping the bundle of product and in position ready to lift the product off its temporary support.

FIG. 5 is a perspective view of an alternate embodiment of the palletizer.

In the figures like reference numerals refer to like elements. To improve the clarity of this description only the major features of the present invention are described in detail. Only general descriptions are provided for components which are well known in the art and could be variously embodied by one of ordinary skill in the art after reading and understanding the principles of the present invention.

DESCRIPTION OF PREFERRED EMBODIMENT

The preferred embodiment can best be seen by looking at FIGS. 1 and 2. As stated above the apparatus shown in FIG. 1 is a small portion of a robotic palletizer that normally would have a vertical mast supporting a boom such as the transverse beam 12 shown in FIG. 1. However for purposes of this disclosure the Figure shows generally the grasping device 10 which is supported on and mounted for possible transverse movement on the transverse beam 12. A movable roller carriage or palm support frame 14 supports the hand and palms used to pick up bundles of product at a first location and transfer them from this station to a pallet located on a remote or second station for further processing.

Supported on the palm support frame is a first palm 16 and a second palm 18 which also operates as a stripper palm in this particular embodiment. Both the first palm and the second palm are similar inasmuch as they comprise a generally flat vertical plate attached to a transverse element bridging the two main longitudinal frame members of the palm support frame. The palms are mounted for movement to this frame such that they can move inboard and outboard by means of actuating cylinders such as the second palm actuating cylinder 22. It should be noted at this point that where similar items are used only one of such similar items has been assigned a reference numeral due to the relative simplicity of the invention set forth herein.

The second palm actuating cylinder 22 will cause the second palm to move inboard and outboard by means of guide means or rollers 24 supported on the palm support frame 14. In addition to the first palm and the second palm, a third palm, known as a bottom support palm 26 which has fingers 30 attached thereto is provided. This bottom support palm is also mounted for inboard and outboard movement by means of cylinders such as the actuating cylinder 32 on the palm support frame 14.

Also carried on the palm support frame 14, in general, at least in this embodiment, close proximity to a medial brace 20 is a clamping plate 36 which is mounted for vertical movement to two vertical cylinders such as cylinder 34 which support the clamping plate.

The grasping device generally 10, is shown positioned above a roller conveyor station 40 having a frame in a plurality of rollers as is well known in the art upon which bundles to be handled by the grasping device are accumulated.

Also mounted to the roller conveyor station, as best seen in FIG. 2, is an elevating means. The elevating means includes a hydraulic or more preferably an air actuated cylinder 42 that supports a lifter bar plate 44. The lifter bar plate is a generally flat rectangular plate to which a plurality of lifter bars such as 46 have been attached. The lifter bars are generally elongated vertical plates spaced on the lifter bar plate at intervals such that they are spaced between the rollers of the roller conveyor station. The lifter bars, upon actuation by the air cylinder 42 can move relatively upwardly through the roller conveyors and can lift and support any item, package, or bundle that would have been supported on the rollers in that section of conveyor at a position above the top of the rollers of the conveyor. The lifter bars will support the bundle of product until such time as the fingers 30 on the bottom support palm 26 can be moved into position below the bundle supported by the lifter bars. Once the fingers are in position supporting the bottom of the bundle the lifter bars 46 and the lifter bar plate, of course, are lowered by means of the air cylinder 42 until the tops of the lifter bars are below the tops of the rollers of the roller conveyor station.

Not shown clearly in FIGS. 1 or 2 but shown in FIGS. 3 and 4 are palm stops such as 54 and 56 whose utility will be explained further on.

Although it has been found that the use of air cylinders for moving the palms and the clamping plate are the preferred embodiment it is also contemplated that such cylinders could be hydraulically actuated.

One nuance of the second palm that should be mentioned is that the second palm 18, although substantially similar to the first palm 16, is further equipped with fingers extending downward from the lower edge of the second palm. These fingers will assist in stripping the bundle off of the fingers 30 of the bottom support palm as the fingers of the bottom support palm are being retracted when the product or bundle has been located at the subsequent work station or pallet. The fingers of the palm of the second palm 18 will interdigitate with the fingers 30 of the bottom support palm such that as the fingers of the bottom support palm are retracted the stripper palm fingers will maintain the product in a predetermined location on the pallet where the product or bundle is being deposited.

The operation of the grasping device will be easily appreciated by a perusal of FIGS. 3 and 4 when studied in combination with the following explanation. In FIG. 3 the grasping device has not approached the item or bundle 50 that it will eventually pick up. The bundle 50 has been transported down a roller conveyor to a roller conveyor station 40 and has been restrained from further movement by a row stop such as 52 shown in FIG. 2. In this location the bundle of product, which might be a stack of individual sheets of unbanded paper, for instance, are ready to be picked up from this location and transported to a second location such as a pallet for further shipment to another work area. In FIG. 3 it should be noted that the first palm 16 is mounted to the palm support frame or movable roll carriage 14 for movement inboard and outboard relative to the position of the bundle 50. It has been found that in an alternative embodiment it may not be necessary to move the first palm inboard and outboard and thus it is possible to have this palm fixed in its position. Either method, that is mounting the first palm 16 for inboard and outboard movement or mounting it in a stationary manner, are equally desirable.

In any event the sequence of picking up the bundle of sheets of paper starts with the actuation of the cylinder 32 which lifts the lifter bar plate 44 and its attendent lifter bars 46 to push the bundle upwardly from and off the rollers of the roller conveyor station. The bundle is now supported from the bottom only by the lifter bars 46. The next stage in preparing to pick up the bundle is to actuate those air cylinders which move the palms 16, 18 and 26 inboard to position the first and second palms immediately adjacent and in contact with the edges of the bundle of papers and to position the fingers 30 of the bottom support palm 26 underneath the bundle of papers. Keeping in mind that the fingers of the bottom support palm 26 will be interdigitated between the lifter bars 46 and, of course, would not contact the lifter bars in an interference way. Casual contact between lifter bars and the fingers of the bottom support palm may be advantageous to assist guiding the fingers into a location underneath the bundle. Once the first and second palms 16 and 18 and the fingers 30 of the bottom support palm 26 are in position, two things can be done. Although the order is not important it may be advantageous to lower the clamping plate 36 by means of actuation of the vertical cylinders 34 which support the clamping plate until the clamping plate is firmly in contact with the top of the bundle. This will help to maintain continuity of the bundle itself. Simultaneously to the positioning of the clamping plate 36 the lifter bar plate and the lifter bars can be retracted by actuation of air cylinder 42 such that the lifter bars retract through and below the deck surface of the roller conveyor station.

Immediately before the retraction of the lifter bar plate and once the fingers 30 of the bottom support plate 26 are in position the palm support frame or movable roller carriage 14 can be moved horizontally or vertically, as is normally done in a robotic palletizer, toward the receiving location of the bundle.

Included in the preferred embodiment is the use of the palm stops 54 and 56 to stop the inboard motion of the first palm and the inboard motion of the second palm at a certain location. The palm stops simply interface or interfere with the palms at a point sufficiently inboard whereby the first palm 16 and the second palm 18 are in contact with the edges of the bundle but have been precluded from exerting an excessive force on the sides of the bundle. Although the palm stops, which are adjustable inboard and outboard, are considered part of the preferred embodiment it is not necessary to have the palm stops in all embodiments incorporating the invention.

Once the bundle has been located in position to be left either on a pallet or at a second work station the grasping device will be actuated such that the bundle will be placed without the bundle having been seriously disrupted during its transport from one location to another due to the four side support provided to the bundle.

Once the bundle is in place it has been found that it is advantageous to first release the clamping plate 36 through actuation of the vertical cylinders 34 supporting the clamping plate then withdrawing the fingers 30 of the bottom support palm by actuating the actuating cylinder with bottom support palm 32. As the fingers are being removed the second palm 18 now acts as a stripper palm by holding the bundle of papers in good alignment through the interface of the major plane of the palm as well as the fingers extending downwardly from the palm in contact with the side of the bundle. Once the fingers 30 have been removed from underneath the bundle the stripper palm 18 will be moved outboard from the bundle by means of its cylinder 22. The palm support frame could be elevated at this point such that the first palm 16 clears the edge of the bundle even though the palm 16 had not been retracted by its cylinder 60. Once the first palm 16 has cleared the bundle, or a previous bundle adjacent to the bundle just deposited, it can be moved outboard through actuation of its cylinder 60 in preparation for being positioned outboard of the next bundle to be picked up.

It has been found that it is possible not to have the first palm 60 moved inwardly and outwardly, but that having it mounted in a single position to the palm support frame may work well in certain circumstances. Although a preferred embodiment is shown and has been described, such a fixed palm embodiment has also been found to be adequately workable.

While one preferred embodiment of the present invention is shown in the figures and described in detail herein, modifications and variations could be developed by one of ordinary skill in the art after the objects of the invention are understood. For example, the generally vertical first and second palms could be coded with a specialized surface or provided with a unique contour for use in handling items other than stacks or bundles of paper. Furthermore the third palm or the bottom support palm 26 could be of another configuration rather than the relatively large flat plate used to support the fingers 30 projecting generally at right angles to the vertical plate of the bottom support palm. Accordingly the present invention is not to be limited to the specifically disclosed preferred embodiment but rather only by a broad reading of the claims which follow.

What is claimed is:

1. In a robotic palletizer of the type used to transport an item having at least two opposed sides, a top, and a bottom, from a support surface at a first location to a second location, an improved grasping device comprising:

a movable roller carriage attached to and part of said robotic palletizer, said movable roller carriage movable to a position above said first location and to a position above said second location;

a first palm carried by said movable roller carriage, said first palm including a substantially flat vertical plate extending downwardly from said movable roller carriage for contacting a first side of said item;

a second palm carried by said movable roller carriage, said second palm including a substantially flat vertical plate extending downwardly from said movable roller carriage for contacting a second opposed side of said item;

at least one of said palms being movable mounted for movement toward and away from the other of said palms to claim the item therebetween;

a bottom support palm carried by and movable generally horizontally along said movable roller carriage for contacting and supporting said bottom of said item, said bottom support palm having a plurality of fingers eminating from a lower edge of said bottom support palm at generally right angles to a vertical component of said bottom support palm toward said second palm, said bottom support palm mounted for inboard movement to a location under said item with said fingers extending under one of said psalms when said grasping device is in said first location;

a clamping plate carried by said movable roller carriage between said first and said second palms, said clamping plate movable vertically to contact said top of said item at said first location; and elevating means mounted at said first location independent of said movable roller carriage, said elevating means capable of lifting and supporting said item above said support surface so that said fingers of said bottom support palm can be positioned below said item as said bottom support palm is moved inboard along said movable roller carriage.

2. The invention in accordance with claim 1 wherein said first palm is fixedly mounted in position to said movable roller carriage.

3. The invention in accordance with claim 1 wherein said first palm is mounted for movement along said movable roller carriage, said movement being provided by a cylinder carried by said movable roller carriage.

4. The invention in accordance with claim 1 wherein said second palm has fingers extending downwardly from a lower edge of said substantially flat plate.

5. The invention in accordance with claim 4 wherein said fingers of said second palm are of such length to extend lower than said first palm when said first palm and said bottom support palm have been moved inboard in preparation for picking up said item.

6. The invention in accordance with claim 1 wherein said second palm is mounted on said movable roller carriage for movement inboardly and outboardly along said movable roller carriage.

7. The invention in accordance with claim 1 wherein said first station comprises a roller conveyor station having a frame supporting a plurality of rollers, said rollers supported on said frame in a manner such that there are spaces between said rollers to accommodate said elevating means when said elevating means is elevated such that a portion thereof projects above said rollers.

8. The invention in accordance with claim 7 said elevating means comprise a lifter bar plate and lifter bars attached to said lifter bar plate, said lifter bars being generally vertical plates spaced apart and arranged generally parallel to the normal location of said fingers of said bottom support palm.

9. The invention in accordance with claim 7 wherein at least one palm stop is carried on said movable roller carriage such that said stop will interfere with the inboard travel of said movable palm.

* * * * *